3,725,291
SORBENT AND METHOD OF MANUFACTURING SAME
Ctibor Serbus, Kutna Hora, Jan Rezac, Kolin, Stanislav Pribil, Trebon, Petr Marvan, Brno, Libor Krejdirik, Kutna Hora, and Artur Stoy, Prague, Czechoslovakia, assignors to Ceskoslovenska Akademie Ved, Prague, Czechoslovakia
No Drawing. Filed Sept. 13, 1971, Ser. No. 180,133
Claims priority, application Czechoslovakia, Sept. 16, 1970, 6,310/70
Int. Cl. C02b 1/00, 5/00
U.S. Cl. 252—180     9 Claims

ABSTRACT OF THE DISCLOSURE

This invention is for a sorbent which comprises an active filler and an active binder, the filler comprising a biological substance, such as telomic plants or algae, and the binder omprising a water-insoluble hydrophilic polymer which preferably contains side groups or substituents which impart desirable sorption properties therein while at the same time acting as an agglomerating means for the active filler, that is, the biological substance and shaping or pelletizing of the mixture. The method of manufacturing the sorbents includes mixing dried and powdered biological substance with a solution of the water-insoluble, hydrophilic polymer in a solvent miscible with water, coagulating the mixture in an aqueous coagulating bath and simultaneously removing the solvent from the solid coagulated mixture.

BACKGROUND OF THE INVENTION

Copending U.S. patent application No. 180,132 filed and derived from the Czechoslovak patent application No. PV 6290–70, relates to a method for the separation of components from aqueous solutions and aerosols which consists in using living or dead biological substances comprising telomic plants such as clover, alfalfa, grass, leaves of trees and the like or algae, as sorbents. The biological substances are economically very advantageous. Their use presents, however, some difficulties in practice because in their most effective pulverized state they form with aqueous solutions messy slurries which cannot be easily filtered and which are entirely unsuitable for filling columns.

Moreover, when the pulverized bio-substance of such plants or algae is pelletted by pressing, it disintegrates when brought into contact with water or aqueous solutions. It was therefore suggested in the mentioned copending patent application to form a binder in situ by polymerizing a monomer in an aqueous dispersion of the pulverized bio-substance. This process is, however, exacting and not easily reproducible because the bio-substance contains water-soluble inhibitors preventing smooth polymerization. It is, therefore, necessary to use hydrophobic monomers, such as butadiene, styrene or vinyl acetate, which form hydrophobic latices with high adhesive properties when polymerized in emulsion. To make the polymerization possible, it is necessary first to remove oxygen which is held tenaciously by the pulverized bio-substance and to use high enough concentrations of polymerization catalysts so that all water-soluble inhibitors are consumed by the catalytic excess. In spite of such measures, the polymerization is often very slow, the conversion and the degree of polymerization is low and the results vary so widely that the use of the method on an industrial scale is rather difficult. Moreover, hydrophobic polymers impair the sorptive capacity of the active filler, not only because they are inactive, but also because they diminish the accessibility of the active filler particles to ions and other solutes, thereby reducing simultaneously the active surface thereof. The sorptive capacity for aerosols is also reduced by such hydrophobic binders.

SUMMARY OF THE INVENTION

The present invention is based on the finding that hydrophilic polymers, swellable in water and aqueous solutions but insoluble therein, and preferably containing active side groups with sorptive capacity, are particularly suitable as binders for the bio-substance (bio-matter) of telomic plants and algae. Blends or mixtures of such active fillers with hydrophilic polymers and preferably those containing side groups such as nitrile, lactam, lacton, amide, imide, carboxyl, hydroxamic acid, sulfonic acid or hydroxyl group, and particularly several or all of them simultaneously, all retain the desirable properties of the components in an unimpaired state and make possible shaping, granulating or pelletizing into any desired shape and size. The sorptive properties of such blends or mixtures are sometimes better than expected, the physico-chemical behaviour of the two components being combined in a favorable manner.

Sorbents of the invention swell in water and in aqueous solutions but are insoluble therein. They can be shaped to any desired form and keep their shape permanently. They can be used in a long series of cycles consisting of sorption, elution of the sorbed compounds or ions, and washing. In this respect they are similar to ion exchangers, but they exhibit simultaneously the properties of those kinds of sorbents which are effective due their extremely large specific surface areas, such as active charcoal or silicagel. The filler, comminuted telomic plants or algae, amounts generally to about 90% or more of the dry substance of the sorbent so that the manufacture is inexpensive. The sorbents of the invention are capable of entrapping and removing heavy metal ions from extremely diluted aqueous solutions even in presence of large quantities of other ions and within comparatively wide limits of pH value. This valuable property makes it possible to recover heavy metals and other components from industrial waste waters, as well as from natural streams and from lakes and seas. The physical behaviour of the sorbent makes it possible to impregnate it with soluble compounds capable of reacting with noxious components of gaseous exhalations and aerosols, or to transform them catalytically to non-toxic products. For treating gases, the sorbents of the invention may be used in air-dry condition, provided that the gases to be treated contain some water vapors.

The term "bio-substance of telomic plants" as employed herein and in the appended claims means comminuted whole plant bodies, such as stems, leaves, flowers and in some cases also roots, fruits, bark and pith and the like of higher, usually, but not necessarily green plants consisting of a high number of specialized cells. Algae are well known simple plants living in water. The bio-substance is preferably more or less dried before use, but it is also possible to use non-dried or wet bio-substance of telomic plants or algae. Dried bio-substance has the advantage of easy grinding or powdering. Dried pulverized bio-substance can be most easily mixed with the binding agent, i.e. with a polymer solution. It is to be further understood that the term "biological substance" is empolyed herein interchangeably with "bio-substance" and includes both telomic plants and/or algae.

PREFERRED EMBODIMENTS OF THE INVENTION

Although any hydrophilic polymer which is swellable in water but insoluble therein may be used, cross-linked polymers are preferred because of their dimensional stability and absence of creep deformation that might impair the penetrability of the treated liquid or gas. Cross-linking can be carried out directly by polymerizing a monomer mixture under cross-linking conditions in presence of the bio-substance of telomic plants or algae. This procedure, however, exhibits the disadvantages mentioned above since the bio-substance contains not only much adsorbed oxygen from the atmosphere, but also some soluble inhibitors which are not easily removed and must thus be overcome by adding a surplus of polymerization catalyst. It is, therefore, preferred to use solvent soluble polymers or copolymers or a mixture of polymers or copolymers in an appropriate water-miscible solvent, to mix the polymer solution thoroughly with dried pulverized telomic plants or algae to form a more or less thick dough, to shape the dough, such as by extrusion through a perforated die and to introduce the moldings or grains thus obtained into an excess of water wherein the polymer is precipitated and the solvent extracted. The polymer is then cross-linked by use of an appropriate agent according to the nature of its side groups. It is, for instance, possible to use a hydrophilic polymer having amidic and imidic side groups and cross-link it using formaldehyde in presence of an acid or use an appropriate epoxide. Polymers having hydroxylic or carboxylic side groups may be cross-linked with di- or tri-isocyanates or also with an appropriate epoxide such as with a low-molecular weight polymer of glycidyl methacrylate. Further methods of cross-linking which are known in the field of macromolecular chemistry may also be used.

Although there is a great number of hydrophilic polymers which can be used in the practice of this invention, copolymers of acrylonitrile or methacrylonitrile with hydrophilic monomers are preferred because of their high mechanical properties, high sorption properties towards metal cations and other solutes, ready availability and comparatively low price. As hydrophilic co-monomers the following ones are among the preferred: acrylic acid, methacrylic acid, acrylamide, methacrylamide, ethylenesulfonic acid and their salts, vinyl pyrrolidone, vinyl pyridine, hydroxyethyl acrylate (ethylene glycol monoacrylate), hydroxyethyl methacrylate (ethylene glycol monomethacrylate), monoacrylates and monomethacrylates of diethyleneglycol, triethylene glycol and higher polyethylene glycols, monoacrylates and monomethacrylates of propylene glycol, glycerol and other polyols, maleic anhydride, glycidyl methacrylate, and glycidyl acrylate and the like. It is to be noted, however, that those set forth are only exemplative not limitative and any other monomer imparting hydrophilicity to the resulting copolymer can be used. Acrylonitrile or methacrylonitrile can be omitted completely if a higher degree of hydrophilicity is desired. Alternatively, they can be replaced by other monomers reducing the excessive hydrophilicity, such as by ethoxyethyl methacrylate or -acrylate, vinyl acetate, vinyl chloride, styrene, vinyl carbazole and others. Very suitable also are copolymers obtained by the partial acid or alkaline hydrolysis of polyacrylonitrile.

Solvents or solvent mixtures are chosen according to the nature of the soluble polymer or copolymer used. If the copolymer contains a significant amount of nitrilic groups, particularly of acrylonitrile units, then dimethyl formamide or dimethyl sulfoxide are preferably employed. Other suitable water-miscible solvents are lower aliphatic alcohols and ketones.

The solvents can be recovered from the resulting aqueous solution by distillation. It is, however, possible to replace the precipitation in water by evaporation of the solvents, preferably under reduced pressure. If the evaporation is carried out rapidly, the sorbent attains additional macroporosity.

Chemical cross-linking may be partly or wholly replaced by ionic cross-linking, using polyvalent cations such as $Cr^{3+}$ or $Al^{3+}$. This type of cross-linking is, however, not as stable as cross-linking by covalent bonds.

Further reactive side-groups can be formed in the polymers or copolymers by usual, known chemical reactions. Thus, anhydride groups of maleic anhydride units can be hydrolyzed to carboxylic groups, carboxylic groups may be reacted with hydroxylamine to obtain hydroxamic acid groups, vinyl acetate units may be partly hydrolyzed to vinyl alcohol units, amidic groups can be reacted with nitrous acid to form carboxylic groups etc. Cross-linking can be carried out also without adding polyfunctional monomers or cross-linking agents, if side groups of different kinds are present which are capable of reacting together in the otherwise finished sorbent, such as by increasing the temperature. If, for instance, a soluble copolymer of hydroxyethyl methacrylate with ethyleneglycol dimethacrylate is used in an ethanol solution, then, after having evaporated the alcohol, the cross-linking can be brought about by wetting the sorbent with a small amount of hydroxyethyl methacrylate, containing polymerization catalyst and heating under an inert gas to a suitable temperature. If a polymer of glycidyl methacrylate is used together with a copolymer containing maleic anhydride units, then cross-linking can be performed by heating the wet sorbent.

Nitrilic groups which form rather firm complexes with ions of silver or monovalent copper form less firm complexes with trivalent gold ions, bivalent palladium and other platinum group ions. Such unstable complexes are, however, easily reduced to metals by the bio-substance or biological substance. Other more common metals such as mercury are entrapped by acidic groups similar to that which occurs in the common, known ion exchangers. The way in which metal ions are caught by the bio-substance itself is not precisely known. It is probable, however, that many metals are bound by the bio-substance which is composed of plants in various ways, dependent generally upon the valence of the metal ions. Aluminum, chromium and trivalent iron are rather firmly bound by hydrophilic polymers which contain carboxylic groups, while bivalent copper, tungsten, molybdenum, vanadium, platinum, uranium, radium and others are bound less firmly and can be thus easy eluated, such as by using organic acids or diluted inorganic acids and their derivatives.

The selectivity of the sorbent can be increased by choosing an appropriate composition for the binding polymer. The nature and acidity of the eluating liquid can be changed in known way to isolate various elements one after another. For example, a binding polymer containing nitrilic and carboxylic or sulfonic groups is capable of binding silver cations so firmly that they are not eluated by dilute nitric acid while all other cations are removed thereby. In the second stage, silver cations may be transformed by chloride ions to insoluble silver chloride which can then be dissolved in an aqueous sodium thiosulfate solution.

THE EXAMPLES

In order to illustrate the present invention more fully, the following illustrative examples are given. It is to be understood that the examples are illustrative only and not limitative. Moreover, in the examples all parts and percents are by weight unless otherwise indicated.

Example 1

150 grams of acrylonitrile and 1 gram of urea were dissolved in 848 grams of 65% decolorized nitric acid. 1 gram of a 5% aqueous solution of ammonium persulfate was added and the solution was left standing under a nitrogen blanket for 7 days 18° C. The viscous solution obtained was heated with slow stirring for 2 hours in a water bath at 45° C., and then poured in a thin stream into 5 litres of cold water. The gel-like, fibrous precipitate was thoroughly washed in water to neutral pH, adhering water was removed in a centrifuge and the swollen polymer was dissolved in 1650 grams of dimethyl formamide and 50 grams of water while stirring and heating to 80° C. The resulting viscous solution, containing 7% by weight of polymer on a dry basis, was mixed with 1260 grams of dry pulverized alfalfa to form a dough which was extruded through a die with 3 mm. holes into water. The polymer was thereby precipitated and the dimethyl formamide dissolved in the water from which it was recovered by distillation. The sorbent was separated on a screen strainer and placed into a glass flask into which 5 ml. of 38% aqueous formaldehyde solution and 1 ml. of concentrated hydrochloric acid were added. The flask was then hermetically closed and heated for 6 hours at 80° C. After cooling to room temperature, the flask was opened, the sorbent washed in water to neutral pH and absence of free formaldehyde and dried.

The sorbent was then comminuted and sieved to grain sizes of from 0.2 to 0.5 mm., swelled 24 hours in distilled water and used for filling a laboratory column. It retained 130 mg. of uranium on 1 gram of dry substance from a 50 p.p.m. uranyl nitrate solution in water. 99% of the uranium was recovered by elution with 10% acetic acid. The column was then washed with water and the cycle was repeated ten times with substantially the same result.

Example 2

Partly hydrolyzed polyacrylonitrile was prepared as described in Example 1 and the solution of the copolymer in nitric acid was coagulated in 5 liters of water in the same manner. The still acidic precipitate was, however, immersed into 1 liter of a 10% aqueous sodium nitrite solution under a hood and left there until no further gases were liberated. The precipitate was then washed in water and dissolved at increased temperature in a 10% aqueous sodium bicarbonate solution to form a 5% solution. The solution was then mixed with a preponderance (about 1260 grams) of dried pulverized clover (*Trifolium pratense*) to form a thin dough (which was then thickened by stirring at 80° C. under 20 torr reduced presusre using a water jet vacuum, pump. On a dry basis the mixture contained 88% by weight of clover and 12% of the polymer. The dough was then extruded into an excess of water containing 1% of hydrochloric acid and 2% of formaldehyde. The mixture was then heated for 8 hours to 85° C. in a sealed flask, then removed, washed in water, dried, comminuted and sieved. In a static experiment, 1 gram of dry substance absorbed 110 mg. of mercury from a 50 p.p.m. mercury nitrate solution in water.

Example 3

A copolymer containing 55 mol percent of acrylonitrile and 45 mol percent of methacrylic acid was prepared by copolymerization in aqueous medium, using potassium metabisulfite and potassium persulfate as redox catalyst. Average molecular weight of the copolymer was about 70,000. Raw washed copolymer, precipitated during the copolymerization, was dissolved in dimethyl formamide to form a 12% solution. The solution was kneaded with dried pulverized algae (*Scenedesmus obliqus*) to a dry basis ratio of 8:92. Then a 10% solution of glycidyl methacrylate polymer (average mol weight about 45,000) in dry dimethyl formamide was added to increase the portion of polymer on a dry basis to 12% by weight. The dough thus obtained was extruded at 70° C. into a container from which the dimethyl formamide vapors were exhausted under a vacuum (50–60 torr). The drying was finished in a vacuum drying box and the sorbent ground and sieved to 0.2–0.6 mm. size grains. In a static experiment, the sorbent retained 85 mg. of gold on each 1 gram of dry sorbent from a 50 p.p.m. aqueous gold trichloride solution, containing 3% of sodium chloride.

Gold was recovered from the ash of the burnt sorbent by amalgamation and evaporation of mercury.

Example 4

A copolymer containing 70 mol percent of methacrylonitrile, 10 mol percent of methacrylamide and 30 mol percent of ethylene sulfonic acid was dissolved in ethyl acetone to form a 10% solution which was then mixed with dried pulverized alfalfa (*Medicago sativa*) to form a dough containing 10% of the copolymer and 90% of the filler on a drug basis. The dough was extruded into a container heated to 60° C., from which the acetone vapors were exhausted. The sorbent was then cross-linked with formaldehyde in the manner described in Example 1. The sorbent was used for removing radium from radioactive mine waters. A filter of the sorbent reduced the radioactivity of water 15 times, using 100 kg. of dry sorbent for 10 m.$^3$ of water. After 30 cycles, the sorbent could be still used. Saturation of the sorbent with calcium limited the sorption capacity for radium, but both elements were easily eluated with dilute hydrochloric acid.

Example 5

29 grams of ethoxyethyl methacrylate, 60.5 grams of diethyleneglycol monomethacrylate, 0.5% of diethyleneglycol dimethacrylate and 10 grams of methacrylic acid were dissolved in 900 grams of ethanol and polymerized with 0.15 gram of dibenzoyl peroxide 6 hours at 75° C. The resulting solution was mixed with 900 grams of dried pulverized hay to form a dough. The dough was granulated and dried. The dried sorbent was then exposed to vapors of a mixture of isomeric toluene di-isocyanates until a satisfactory stability in ethanol was attained. The material was washed in ethanol and dried. It had good sorption capacity for uranium, mercury, lead and other heavy metal cations.

Numerous variations of the embodiments of this invention may be made without departing from the spirit and scope thereof. It is to be understood, therefore, that this invention is not to be limited to the disclosed embodiments except as defined in the appended claims.

We claim:

1. Sorbent, comprising a preponderant proportion of at least one biological substance selected from the group consisting of telomic plants and algae and a minor proportion of a water-insoluble hydrophilic polymer.

2. Sorbent, as defined in claim 1, wherein both said biological substance and said polymer are intimately mixed, shaped and granulated.

3. Sorbent, as defined in claim 1 wherein the polymer has preponderantly carbon-to-carbon main chains and preponderantly hydrophilic side substituents selected from the group consisting of amidic, imidic, carboxylic, sulfonic, hydroxamic, hydroxylic, nitrilic, lactamic, lactonic and pyridine groups and their mixtures, and contains simultaneously a minor portion of hydrophobic side substituents.

4. Sorbent, as defined in claim 3 wherein the hydrophilic polymer is cross-linked.

5. Method of manufacturing a sorbent comprising intimately mixing a preponderant proportion of at least one dried and powdered biological substance selected from the group consisting of telomic plants and algae with a minor proportion of a solution of a water-insoluble, hydrophilic polymer in a solvent miscible with water, coagulating the mixture in an aqueous coagulating bath and simultaneously removing the solvent from the solid coagulated mixture.

6. A method as defined in claim 5, wherein the solvent is washed out and the hydrophilic polymer is cross-linked.

7. Method as defined in claim 5 wherein the mixture is extruded into a heated closed space and the solvent removed by evaporation.

8. Method as defined in claim 7 wherein the hydrophilic polymeric material is cross-linked during the evaporation of the solvent.

9. Method as defined in claim 7 wherein the hydrophilic polymer is cross-linked after the evaporation of the solvent.

References Cited

UNITED STATES PATENTS 3,685,598  8/1972  Miller _____ 99—2 R
3,635,713  1/1972  Paesschen et al. _____ 96—85
3,626,049  12/1971 Yamamoto et al. _____ 264—236
3,510,433  5/1970  Pasowicz _____ 252—180

GEORGE F. LESMES, Primary Examiner
W. R. DIXON, Jr., Assistant Examiner

U.S. Cl. X.R.

210—24, 31 R, 31 C, 38, 179; 260—8, 2.1